Figures 1, 2:
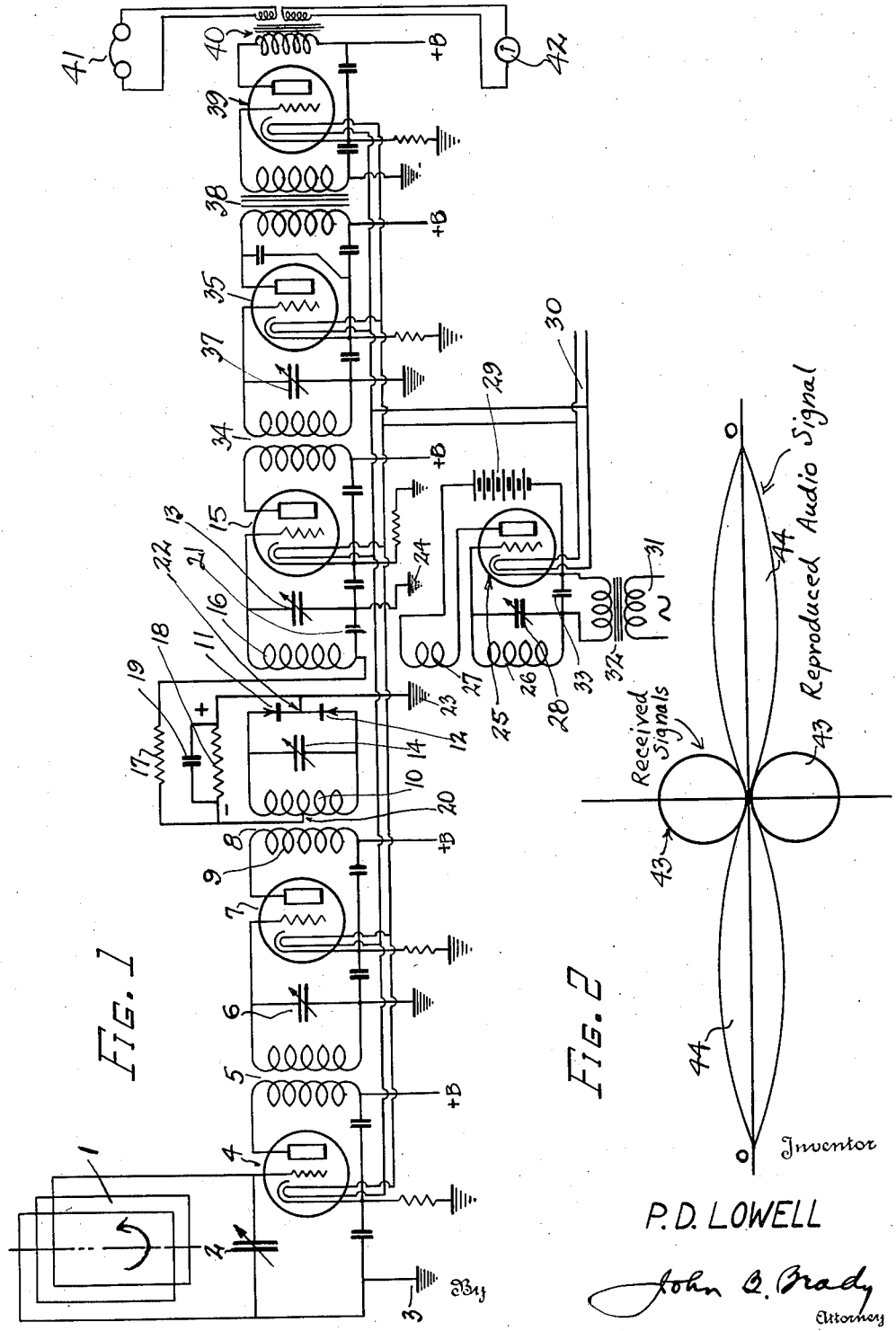

March 23, 1937.   P. D. LOWELL   2,074,408
DIRECTION FINDING SYSTEM
Filed June 8, 1933

Inventor
P. D. LOWELL
John C. Brady
Attorney

Patented Mar. 23, 1937

2,074,408

UNITED STATES PATENT OFFICE 2,074,408

DIRECTION FINDING SYSTEM

Percival D. Lowell, Chevy Chase, Md., assignor to Radio Corporation of America, New York, N. Y., a corporation of Delaware Application June 8, 1933, Serial No. 674,909

10 Claims. (Cl. 250—11)

My invention relates broadly to radio compass or direction finding systems and more particularly to a circuit arrangement for a radio compass or direction finder of improved efficiency.

One of the objects of my invention is to provide a radio compass or direction finding system wherein a bearing can be taken with respect to a distant transmitting station using the minimum signal position of the loop for receiving the signal energy while operating an indicator with maximum reproduced signal energy.

Another object of my invention is to provide a circuit arrangement for a direction finding system wherein an extremely sharp maximum signal characteristic may be obtained for observation of the direction of the transmitting station for improving the precision which is obtainable in the taking of direction finder bearings.

Still another object of my invention is to provide a circuit arrangement for a direction finder or radio compass wherein the current at the signal indicator is a maximum when the received signal carrier is a minimum, and vice versa, for permitting a maximum signal effect to be obtained for the minimum or zero position of the coil antenna employed in the radio compass or direction finder system.

A further object of my invention is to provide a circuit arrangement for a direction finder or radio compass wherein the effect of a local oscillator may be controlled to activate a signal indicator according to the amplitude of signal energy intercepted by the direction finder coil or radio compass antenna, the amplitude of the energy originating from the local oscillator being a maximum for the minimum signal position of the radio compass coil.

A still further object of my invention is to provide a circuit arrangement for a detector system in a radio compass receiving circuit for rendering effective upon an indicator circuit energy from a local oscillator in inverse proportion to the signal strength intercepted by a coil antenna direction finder system.

Other and further objects of my invention reside in a circuit arrangement for a direction finding system as set forth more fully in the specification hereinafter following by reference to the accompanying drawing, in which:

Figure 1 diagrammatically illustrates the circuit arrangement of my invention; and Fig. 2 shows the signal response curve characteristic of the radio compass system of my invention.

A radio direction finder or radio compass ordinarily uses as an antenna, a closed loop or coil antenna which has the well known figure of eight directional characteristic and the minimum signal or null points are used to determine the line of direction of a received signal. The main undesirable feature of the null method, now ordinarily employed, is that it is difficult to obtain an accurate reading on an indicating device because the signal level is so low that the indicating device reads so near the zero point. It would be more desirable to have the indicator reading near full scale when taking a bearing as this would enable the operator to obtain a more accurate setting of the loop antenna.

My invention provides for the precision operation of a loop on the minimum signal position thereof and yet insures maximum signal energy at the signal indicator for taking an accurate bearing from a distant transmitting station.

Referring to the drawing in detail, reference character 1 designates a loop antenna tuned by variable condenser 2 and connected to ground 3 for operation as a uni-lateral or uni-directional radio compass. The input to the receiving circuit is impressed across the input of a radio frequency amplifier designated generally as including the electron tube 4, coupling transformer 5, tuning means 6, electron tube 7 and an output transformer 8. The output transformer 8 has primary winding 9 connected in the output circuit of the radio frequency amplifier and secondary winding 10 coupled thereto and electrically connected with a full wave rectifier circuit which I have represented schematically by means of rectifiers 11 and 12. The full wave rectifier circuit is tuned by means of condenser 14. The radio frequency energy impressed upon the full wave rectifier circuit is rectified and smoothed out by condenser 19 to produce a direct current that is impressed upon the grid of the intermediate frequency amplifier constituted by electron tube 15 whose input circuit includes a tuned circuit constituted by inductance 16 and tuning condenser 13. The grid return circuit of the intermediate frequency amplifier is connected with the full wave rectifier circuit through the filtering resistor 17. The rectified output of the rectifier is shunted by resistor 18 and condenser 19 and it is the drop in direct current potential across this resistor which is fed into the grid return circuit of the intermediate frequency amplifier. Condenser 19 serves to provide a filtering effect upon the rectified signal energy.

A midtap connection 20 is taken from the secondary winding 10 of transformer 8 to one end of resistance 17 which in turn connects to the grid return end of inductance 16 and one side of bypass condenser 21. The tap 20 also connects to one end of resistance 18 and condenser 19, the opposite ends of which connect to the midpoint 22 between the rectifiers 11 and 12 and the ground, represented at 23. The opposite side of by-pass condenser 21 is connected to ground as shown at 24, thereby completing a circuit for the transfer of rectified and filtered energy from the full wave rectifier to the grid return of the intermediate frequency amplifier circuit.

I provide a radio frequency oscillator including electron tube 25 having its input and output circuits electromagnetically coupled by the inductive relation of winding 26 in the input circuit and winding 27 in the output circuit. The input circuit of the radio frequency oscillator tube 25 is tuned by means of condenser 28. A suitable source of potential 29 is provided in the output circuit of the oscillator. The heater element in oscillator tube 25 and the heater elements for all of the electron tubes in the receiving system are energized from a common power supply circuit shown generally at 30. An audio frequency source is connected to terminals 31, and audio frequency energy is impressed through transformer 32 upon the input circuit of the oscillator 25 and across by-pass condenser 33 connected therein. The frequency of the oscillator 25 is fixed by adjusting condenser 28. As an example of frequency values which may be employed, consider, for example, that oscillator 25 is tuned to 100 k. c. The audio frequency source may be given a frequency of 1000 cycles.

The intermediate frequency amplifier 15 has its input circuit 16—13 tuned to 100 k. c. which is the frequency impressed thereon by the oscillator 25. The output of the intermediate frequency amplifier 15 is coupled through transformer 34 to the input circuit of the detector 35. The input circuit of the detector 35 is tuned to a frequency of, for example, 100 k. c. The input to the detector 35 is tuned by means of condenser 37 connected across the secondary of the transformer 34. The output of detector 35 is coupled through audio frequency transformer 38 through one or more stages of audio frequency amplification represented by electron tube 39. The output circuit of the final stage of audio frequency amplification may include the primary winding of a transformer 40 having a pair of secondary windings, one of which connects with a telephone headset or electromagnetic device 41 for giving an audible response to the directional signaling energy or a visual indication may be secured for the radio compass system by means of the connection of the other secondary winding to meter 42. The instrument indicated at 42 is an alternating current milliammeter having a calibrated scale for visually indicating a response to maximum and minimum signal conditions for correspondingly determining the directivity of a transmitting station according to the angular position of the coil antenna 1.

Referring to Fig. 2 of the drawing, the figure of eight characteristic curve 43 represents the usual receiving characteristic of a loop antenna when rotated 360° in the presence of an electromagnetic field emanating from a source in the direction of the line 0—0. In the unidirectional or unilateral system of Fig. 1, the characteristic response curve has either a "figure-of-eight" pattern, or else the shape of a cardioid. In the circuit of my invention, the indicator 42 is actuated by reproduced audio frequency energy which varies according to the characteristic curve 44, that is, along line 0—0 where the energy represented by curve 44 is a maximum when the received energy represented at curve 43 is a minimum. This effect is brought about by the control of the negative bias on the grid of the intermediate frequency amplifier 15 according to the energy supplied thereto from the detector system 11—12. The direct current drop across resistor 18 controls the grid bias and consequently, the gain of the intermediate frequency amplifier 15 so that the stronger the signal received on the loop 1, the greater the direct current drop across resistance 18 and, therefore, the grid of the intermediate frequency amplifier 15 becomes more negative and the lower will be the gain and the weaker the energy in the output circuit of the final audio frequency amplifier stage for actuating the indicator 42. In other words, when the received signal carrier is at its maximum, the readings on indicator 42 is a minimum, and vice versa. The resistance 17 serves to isolate the tuned circuit 10—14 from the rectifiers 11—12.

The curve 43 in Fig. 2 also represents the relative values of direct current across the resistors 18 in the rectifier circuit. Curve 44 represents the relative change in gain of the intermediate radio frequency amplifier 15 and the resulting audio frequency response on the indicating meter 42 from the modulated oscillator source 31. Curve 44 is represented as an elongated ellipse wherein the energy is a maximum when the loop signal is a minimum because an increase in the loop signal decreases the gain in the intermediate frequency amplifier 15 and vice versa. The amount of elongation of the ellipse 44 will vary with the number of radio frequency amplifier stages which are employed in both the radio frequency and intermediate frequency amplifiers, the type of tubes used, etc., so that by proper design, the ellipse can be made very elongated and consequently will be a sharp turn at its ends. The more elongated the ellipse, the sharper will be the maximum signal response at the point where the loop signal is a minimum for operating either the telephone headset 40 or the indicating meter 42. The energy for operating the telephone headset 40 or indicating meter 42 is furnished from modulator 31 and is permitted to become effective upon the telephone headset or indicating meter 42 in greater degree as the directive signal received by loop 1 becomes a minimum. That is to say, the bias potential on the grid of intermediate frequency amplifier 15 is so controlled that as the signal strength intercepted by loop 1 varies, an inverse condition of audio frequency signal response is obtained at the telephone headset 40 or indicating meter 42.

The several stages of amplification, the first detector system, the oscillator, the intermediate frequency amplifier system, the second detector and the audio frequency amplification system, have all been shown diagrammatically. I have illustrated a customary arrangement of by-pass condensers, resistors and connections to ground for each of the tube circuits. While I have shown the first detector system as constituted by detectors 11 and 12, it will be understood that these may be electron tubes. The customary arrangement of plate potential supply may be employed for all of the tubes in the system. By indicating a separate plate potential supply for oscillator tube 25, I do not intend that the circuit shall be so limited, as the same plate potential supply which is employed for the other tubes of the system may be employed for the local oscillator.

The precision of operation of a direction finder system is greatly increased by use of the circuit of my invention and the convenience of operation is much improved.

While I have described my invention in one of its preferred embodiments, I realize that modifications may be made by those skilled in the art and I desire that it be understood that modifications of my invention may be made and that no limitations upon my invention are intended other than are imposed by the scope of the appended claims.

What I claim as new and desire to secure by Letters Patent of the United States is as follows:

1. A radio compass system comprising an angularly adjustable coil antenna, a signal receiving circuit connected with said coil antenna and including a high frequency amplifier, a rectifying system connected with the output of said high frequency amplifier, an intermediate frequency amplifier connected with the output of said rectifying system, a detector system connected with the output of said intermediate frequency amplifier, and a signal indicator connected in circuit with the output of said detector system, a high frequency oscillator coupled with said intermediate frequency amplifier, means for modulating said oscillator at an audible frequency, and means controlled by said rectifying system for rendering said intermediate frequency amplifier responsive to energy delivered by said oscillator in inverse proportion to the amplitude of the signal energy intercepted by said angularly adjustable coil antenna.

2. A radio compass system comprising an angularly adjustable loop antenna, a signal receiving circuit connected with said loop antenna and including a high frequency amplifier, a rectifying system connected with the output of said high frequency amplifier, an intermediate frequency amplifier connected with the output of said rectifying system, a detector system connected with the output of said intermediate frequency amplifier, and a signal indicator connected in circuit with the output of said detector system, a high frequency oscillator coupled with said intermediate frequency amplifier, means for modulating said oscillator at an audible frequency, means including a biasing resistor disposed between said rectifying system and the grid circuit of said intermediate frequency amplifier for impressing a blocking potential thereon when the signal energy intercepted by said angularly adjustable loop is a maximum thereby to prevent the transfer of energy from said oscillator to said signal indicator, and, conversely, for unblocking said intermediate frequency amplifier when the signal energy intercepted by said loop is a minimum thereby to render said oscillator effective upon said signal indicator for enabling the direction of a distant transmitting station to be determined when the plane of said loop is normal to the direction of the distant transmitting station.

3. In a direction finding system, a coil antenna angularly adjustable to various positions from a maximum signal position in a plane coincident with the line of direction of a distant transmitting station to a minimum signal position normal to the line of direction of a distant transmitting station, an audible frequency modulated oscillator, an intermediate frequency amplifier coupled with said oscillator, a detector connected with the output of said intermediate frequency amplifier, a signal indicator connected with said detector, and means including a circuit interconnecting said coil antenna with said intermediate frequency amplifier for so controlling the bias potential of said intermediate frequency amplifier that the energy derived solely from said modulated oscillator becomes effective upon said signal indicator in inverse proportion to the amplitude of the signal energy intercepted by said coil antenna.

4. In a direction finding system, a coil antenna angularly adjustable to various positions upon a maximum signal position in a plane coincident with the line of direction of a distant transmitting station to a minimum signal position normal to the line of direction of a distant transmitting station, an audible frequency modulated oscillator, an intermediate frequency amplifier coupled with said oscillator, a detector connected with the output of said intermediate frequency amplifier, a signal indicator connected with said detector, a high frequency amplifier having input and output circuits, a full wave rectifier connected with the output of said high frequency amplifier, connections between the input of said high frequency amplifier with said coil antenna, and circuit connections from said full wave rectifier to the circuit of said intermediate frequency amplifier for controlling the operating characteristic thereof for effecting minimum transfer of energy from said oscillator to said signal indicator when the plane of said coil antenna is moved to a position coincident with the line of direction of the distant transmitting station.

5. In a direction finding system, a coil antenna angularly adjustable to various positions from a maximum signal position in a plane coincident with the line of direction of a distant transmitting station to a minimum signal position normal to the line of direction of a distant transmitting station, an audible frequency modulated oscillator, an intermediate frequency amplifier coupled with said oscillator, a detector connected with the output of said intermediate frequency amplifier, a signal indicator connected with said detector, a high frequency amplifier having a tuned input circuit connected with said coil antenna, a full wave rectifier connected with the output of said high frequency amplifier, means for deriving a biasing potential from said full wave rectifier, and circuit connections for impressing said biasing potential upon said intermediate frequency amplifier for variably controlling the operating characteristics thereof and for rendering the effect of said oscillator upon said signal indicator a minimum when the plane of said coil antenna is in the line of direction of the transmitting station.

6. A radio compass system comprising a rotatable loop antenna adjustable to different angular positions from a maximum signal position to a plane coincident with the line of direction of a transmitting station to a minimum signal position in a plane normal to the line of direction of the transmitting station, a tunable signal receiving circuit connected with said loop antenna, a rectifier system connected with said signal receiving circuit, a resistor connected with said rectifier system through which the direct current output of said rectifier system is passed, an audio frequency modulated oscillator, an electron tube amplifier system coupled with said oscillator, a detector connected with said electron tube amplifier system and a signal indicator connected with said detector, and a circuit from said resistor in the grid circuit of said electron tube amplifier for impressing a biasing potential thereon which becomes increasingly negative as the plane of said loop antenna coincides with the line of direction of the transmitting station for effecting a minimum transfer of energy from said modulated oscillator to said signal indicator.

7. In a direction finder system, an audio frequency modulated oscillator, an amplifier coupled with said oscillator, said amplifier having a control grid circuit and an output system, a detector coupled with said output system, a signal indicator connected with said detector, a loop antenna rotatable to various angular positions from a maximum signal position in a plane coincident with the line of direction of a distant transmitting station to a minimum signal position normal to the line of direction of the distant transmitting station, a signal receiving circuit connected with said loop antenna, and means in said signal receiving circuit for deriving a variable biasing potential which varies from a maximum when the plane of said loop is in line with the distant transmitting station to a minimum when the plane of said loop is normal to the line of direction of the distant transmitting station, and means for impressing said biasing potential on the control grid circuit of said amplifier for effecting a minimum transfer of energy from said oscillator to said signal indicator when the plane of said loop is aligned with the direction of the distant transmitting station.

8. In a direction finder system, an audio frequency modulated oscillator, an amplifier coupled with said oscillator, said amplifier having a control grid circuit and an output system, a detector coupled with said output system, a signal indicator connected with said detector, a loop antenna rotatable to various angular positions from a maximum signal position in a plane coincident with the line of direction of a distant transmitting station to a minimum signal position normal to the line of direction of the distant transmitting station, a signal receiving circuit connected with said loop antenna, and means in said signal receiving circuit for deriving a variable biasing potential which varies from a maximum when the plane of said loop is in line with the distant transmitting station to a minimum when the plane of said loop is normal to the line of direction of the distant transmitting station, and resistors connected between said last mentioned means and the control grid circuit of said amplifier for impressing the said biasing potential thereon for controlling the operating characteristic of said amplifier and limiting the transfer of energy from said oscillator to said indicator at a minimum when the plane of said loop antenna is in the line of direction of the distant transmitting station.

9. In a direction finder, a rotatable loop antenna, a radio frequency amplifier having its input connected to said loop antenna and its output connected to an inductance, a detector system comprising, a rectifier connected with an inductance coupled to said first named inductance, an intermediate frequency amplifier comprising, a thermionic tube device having input and output electrodes, a direct current path including an impedance connecting the input electrodes of said tube device to a point on said detector system, an oscillator coupled with said intermediate frequency amplifier, means for modulating said oscillator at a pre-determined audible frequency, a second detector connected with the output electrodes of said intermediate frequency amplifier and an audible frequency amplification system connecting said second detector to an indicator, the effect of said modulated oscillator upon the gain of said intermediate frequency amplifier being controlled by the amount of direct current produced by the signal energy and fed into the input electrodes of the intermediate frequency amplifier, said direct current being provided by the rectification and smoothing out of the signal energy picked up by said loop.

10. A direction finding system having a directional antenna, a signal receiving circuit connected with said antenna, a rectifier in said receiving circuit, a relay operative in response to variations in the amplitude of signaling energy impressed upon said rectifier, a local source of oscillations, an amplifier having a gain control device operable in dependence upon the response of said relay to signal amplitude variations, and an indicator connected to said local source through said amplifier, said system being further characterized in that it constitutes a means for deriving a maximum response in said indicator to the energy of said local source when the signal response in said receiving circuit is a minimum, and vice versa.

PERCIVAL D. LOWELL.